United States Patent
Smith et al.

(10) Patent No.: US 10,659,866 B2
(45) Date of Patent: May 19, 2020

(54) ELASTOMERIC PRESSURE TRANSDUCTION BASED USER INTERFACE

(71) Applicant: Apple Inc., Cupertino, CA (US)

(72) Inventors: John Stephen Smith, San Jose, CA (US); Storrs T. Hoen, Brisbane, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/131,996

(22) Filed: Sep. 14, 2018

(65) Prior Publication Data

US 2020/0092629 A1    Mar. 19, 2020

(51) Int. Cl.

| H04R 1/10 | (2006.01) |
|---|---|
| G01L 9/04 | (2006.01) |
| G01L 1/02 | (2006.01) |
| H04R 9/06 | (2006.01) |
| G01L 9/12 | (2006.01) |
| G01L 9/06 | (2006.01) |
| G01L 9/08 | (2006.01) |

(52) U.S. Cl.
CPC ............ *H04R 1/1041* (2013.01); *G01L 1/02* (2013.01); *G01L 9/04* (2013.01); *H04R 1/1016* (2013.01); *H04R 1/1058* (2013.01); *G01L 9/06* (2013.01); *G01L 9/08* (2013.01); *G01L 9/12* (2013.01)

(58) Field of Classification Search
CPC ..... G01L 9/06; G01L 9/04; G01L 1/02; G01L 1/06; G01L 9/08; H04R 1/1058; H04R 1/1016; H04R 1/1041

USPC .................................................... 381/74, 334
See application file for complete search history.

(56) References Cited

U.S. PATENT DOCUMENTS

| 4,267,725 | A | 5/1981 | Roth et al. |
|---|---|---|---|
| 6,023,033 | A | 2/2000 | Yagi et al. |
| 6,731,219 | B1 | 5/2004 | Wheat et al. |
| 7,191,662 | B2 | 3/2007 | Weber et al. |
| 8,124,900 | B2 | 2/2012 | Ruppert |
| 8,232,485 | B2 | 7/2012 | Chen et al. |
| 8,619,062 | B2 | 12/2013 | Powell et al. |
| 8,847,895 | B2 | 9/2014 | Lim et al. |

(Continued)

FOREIGN PATENT DOCUMENTS

| CN | 103567634 | 2/2014 |
|---|---|---|
| DE | 102012009039 | 11/2013 |

(Continued)

*Primary Examiner* — Ammar T Hamid
(74) *Attorney, Agent, or Firm* — Brownstein Hyatt Darber Schreck, LLP

(57) ABSTRACT

Disclosed herein are electronic devices having a deformable surfaces through which a user can provide inputs to the device by applying a force such as a pinch or a squeeze. A particular embodiment is an earpiece with the deformable surface part of an elongate section extending from an earbud. The deformable surface includes an incompressible hyperelastic material and a pressure sensor. The pressure sensor includes a pressure sensing element and a void defined between the pressure sensing element and the incompressible hyperelastic material. An applied force is transferred by the incompressible hyperelastic material to compress the void and change an internal pressure thereof. The changed pressure is detected by the pressure sensor, and can result in changed operation of the electronic device.

18 Claims, 11 Drawing Sheets

(56) References Cited

U.S. PATENT DOCUMENTS

| | | | |
|---|---|---|---|
| 8,928,621 B2 | 1/2015 | Ciesla et al. | |
| 9,052,790 B2 | 6/2015 | Yairi et al. | |
| 9,063,627 B2 | 6/2015 | Yairi et al. | |
| 9,122,340 B2 | 9/2015 | Jung et al. | |
| 9,477,308 B2 | 10/2016 | Ciesla et al. | |
| 9,916,942 B2 | 3/2018 | Shedletsky | |
| 10,275,069 B2 | 4/2019 | Smith | |
| 2010/0108486 A1 | 5/2010 | Yoshida | |
| 2012/0010535 A1* | 1/2012 | Kubiak | A61B 5/1036 600/592 |
| 2012/0256867 A1 | 10/2012 | Annacone | |
| 2015/0264472 A1* | 9/2015 | Aase | H04R 1/1041 381/74 |
| 2015/0377166 A1* | 12/2015 | Yasuda | F02D 41/0002 123/406.41 |
| 2017/0045976 A1 | 2/2017 | Bushnell et al. | |
| 2017/0090604 A1 | 3/2017 | Barbier | |
| 2017/0095925 A1* | 4/2017 | Yamane | B25J 9/1676 |
| 2017/0367596 A1* | 12/2017 | Mehrotra | A61B 5/02108 |
| 2018/0196567 A1* | 7/2018 | Klein | G06F 3/0414 |
| 2018/0242908 A1* | 8/2018 | Sazonov | A61B 5/4866 |
| 2018/0267640 A1 | 9/2018 | Virgil et al. | |

FOREIGN PATENT DOCUMENTS

| | | |
|---|---|---|
| EP | 1983803 | 10/2008 |
| WO | WO 04/093490 | 10/2004 |
| WO | WO 07/049254 | 5/2007 |

\* cited by examiner

ELASTOMERIC PRESSURE TRANSDUCTION BASED USER INTERFACE

FIELD

The present disclosure generally relates to electronic devices, such as earpieces, having pressure or force sensing user interfaces to detect inputs by a user. Such inputs may be made by physical press or squeeze actions by the user.

BACKGROUND

Electronic devices are commonplace in today's society. Example electronic devices include cell phones, laptop and tablet computers, personal digital assistants, and the like. Such electronic devices often produce audio, visual, or other output for a user, and can receive inputs from the user, such as from a microphone, a touch of a finger or a stylus on a display, and so on.

For better or private reception, audio output is often transmitted to a speaker that is part of an earpiece worn by the user. The earpiece may also include a microphone for the user to enter verbal commands to an electronic device or to communicate via a call managed by the electronic device. This can allow the user to move while in communication with the electronic device.

It is often desirable for the user to be able to adjust properties of the audio communications, such as volume, without contacting the electronic device but instead applying an input to the earpiece by physical contact. Mechanisms such as buttons or scroll wheels can be used, but may introduce noise into the earpiece.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

This application is directed to devices and methods for user input to electronic devices based on user applied forces, such as squeezes or pinches, applied to a deformable input section of the electronic device. Disclosed herein are components, devices, and methods for receiving or providing user input to electronic devices. The user input can include a squeeze or pinch input to a deformable surface or deformable input section of the electronic device. Other forms of an applied force may also be used for user input, such as a one-sided press on a deformable surface opposite a rigid surface.

In one set of embodiments, a deformable surface may encapsulate an incompressible hyperelastic material, with the deformable surface configured as a shell containing the incompressible hyperelastic material. The deformable surface may itself form part of a housing forming an exterior surface of an electronic device. The incompressible hyperelastic material may define a void, i.e., a 3-dimensional space or volume, such as may contain a gas, a fluid, a jell, a solid having a low shear modulus or other material. The incompressible hyperelastic material may be silicone. A pressure sensor having a pressure sensing element may be connected with the deformable surface or embedded within the incompressible hyperelastic material, with the pressure sensing element positioned to detect a pressure in the void.

A squeeze or pinch force applied to the deformable surface, such as applied by fingers of a user to either the deformable surface or the electronic device's housing, may be transferred by the incompressible hyperelastic material to the void, and can change the pressure in the void. The change in the pressure in the void can be detected by a pressure sensing element of a pressure sensor, which can transmit a signal to a processor or control electronics that can interpret the signal as a user input.

In further embodiments, the deformable surface may form part of a sealed region or volume contained within an electronic device. The sealed region may encapsulate the incompressible hyperelastic material. A force applied to the housing of the electronic device can be transmitted to the deformable surface and cause the incompressible hyperelastic material within to compress the volume of the void. This can increase the pressure in the void. A pressure sensor may either be encapsulated within the incompressible hyperelastic material or may form part of a surface containing the incompressible hyperelastic material.

The user input devices can also include a controller that contains a processor or control electronics that can receive a signal produced by the pressure sensor. In response to the signal, the controller can alter an operation of the electronic device.

The present disclosure also describes an earpiece to which a user can give inputs, such as to alter operation of the earpiece, by applying a force to a deformable input section of the earpiece. The deformable input section can include a deformable surface. The deformable surface may be a section of a housing of the earpiece or may be internal to the earpiece. The earpiece can include a pressure sensor mechanism contained within or connected with the deformable input section. The pressure sensor mechanism may contain an incompressible hyperelastic material, which can be within a sealed region, and a pressure sensing element. The pressure sensing element can be positioned to detect a pressure in a void defined within the incompressible hyperelastic material. A force applied to a flexible section of the housing that includes the deformable input section can be transferred by the incompressible hyperelastic material to the void and be detected by the pressure sensing element. The incompressible hyperelastic material may be silicone. The incompressible hyperelastic material may be contained in a sealed region within the earpiece.

In response to the applied force, the pressure sensor may produce a signal received by a processor or control electronics. The processor or control electronics can alter an operation of the earpiece based on the signal. In some embodiments the signal can be analog, whereas in some embodiments the signal may include a discrete set of values or levels. Still further embodiments can use a combination of analog and discrete signal values.

The present disclosure also describes an input mechanism for an electronic device. The user input mechanism may include a deformable region or volume containing an incompressible hyperelastic material, a pressure sensor having a pressure sensing element and attached to the deformable region, and a compressible region between the incompressible hyperelastic material and the pressure sensing element.

The user input mechanism may be configured so that a user applied force on a section of the electronic device causes a volume reduction of the compressible region that can be sensed by the pressure sensing element.

BRIEF DESCRIPTION OF THE DRAWINGS

The disclosure will be readily understood by the following detailed description in conjunction with the accompanying drawings, wherein like reference numerals designate like structural elements.

Figure 1A:
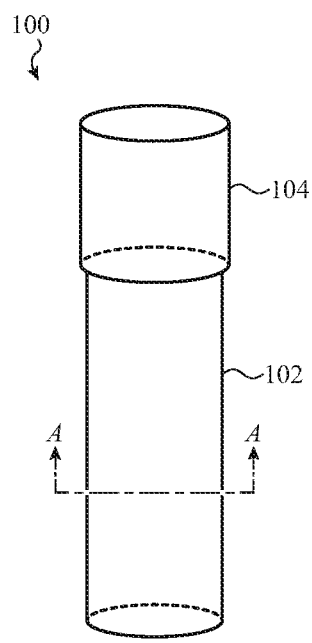
FIG. 1A illustrates a user input component of an electronic device, according to an embodiment.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The embodiments described herein are directed to user input devices, or user input components of electronic devices, that detect press, pinch, or squeeze inputs on deformable surfaces of the input devices. Such input devices include, but are not limited to, earpieces communicatively linked with electronic devices, control modules for headsets, styluses for display screens, and the like.

Electronic devices may have user input components or mechanisms by which a user can control operations of the electronic devices, such as volume control or on/off switching, audio track selection, phone call operations, and the like. However, such input mechanisms can require the user to divert attention to the electronic device to locate the input mechanism on the electronic device, and then perform an operation such as toggling a switch, pushing a button, or moving a slider mechanism. This can be especially awkward or cumbersome for earpieces. Also, buttons, toggles, sliders, and the like may not match all users' finger sizes, creating uncomfortable user interaction. Further, such operations may produce audible clicks, cause disruptions of communication, cause dislodgement of the earpiece, or have other disadvantages.

Disclosed herein are user input devices that may alleviate some or all of the disadvantages just noted. A user need only apply a press, pinch, or squeeze to a deformable input section of the electronic device to provide an input. Many of the embodiments are configured so that applied forces may still be recognized as user inputs regardless of the direction of their application. This can allow for ease of use and ergonomic comfort.

The disclosed user input devices may include a deformable input section having a deformable surface that forms a flexible section of a housing of the electronic device, or alternatively is contained within the housing of the device. The deformable input section in some embodiments is an elongate tubular section. For example, an earpiece can have such a deformable input section extending from an earbud component. The deformable input section can contain an incompressible, elastic material defining or in contact with a void, with the void typically containing a gas or other material capable of hydrostatically transferring a force to an object or surface. When a force is applied to the housing, the force will be transferred to the material, causing it to elastically spread. The applied force can cause a decrease in an internal volume of the deformable input section as a whole. The elastic spreading of the material can cause a decrease in the volume of the void. The decrease in volume can result in an increase in pressure in the void, which can be detected with a pressure sensor.

A signal from the pressure sensor, indicating the value of the pressure in the void, can be received at a processor or control electronics of the electronic device. The processor may alter operation of the electronic device based on the received signal. In one example, a squeeze applied to a deformable surface can be used as a volume control for a speaker of an earpiece.

These and other embodiments are discussed below with reference to FIGS. 1A-7. However, those skilled in the art will readily appreciate that the detailed description given herein with respect to these figures is for explanatory purposes only and should not be construed as limiting. In the figures like reference numerals are used to designate similar components.

FIG. 1A illustrates a general structure for a user input component 100 of an electronic device by which a user can provide an input to the electronic device. The user input component 100 can be used in a variety of electronic devices, such as those explained below in relation to FIGS. 2A-C.

The user input component 100 may include a first component 102, having deformable surface 102 of the electronic device. In some embodiments a user can apply a squeeze or pinch to the deformable surface 102 directly with two or more fingers to apply forces from opposing sides. In other embodiments, a user can apply a squeeze to an exterior flexible housing of the electronic device, which surrounds the deformable surface 102. The force of the squeeze may be transferred to the deformable surface 102. The deformable surface 102 may have an elongate shape, i.e., have an extent in one dimension appreciably longer than in any other dimension, though this is not required. The deformable surface 102 may have a size sufficient at least to be squeezed or pinched by two fingers of a user. Hereinafter, the terms "squeeze" and "pinch" will be considered equivalent operations. The deformable surface 102 may include or have attached one or more sensors operable to detect a force of a squeeze applied to it. The sensor or sensors may output one or more signals to alter an operation of the electronic device.

The user input component 100 may also include a controller 104 containing a processor or control electronics operable to receive the signals from the one or more sensors of the deformable surface 102. The processor or control electronics may include one or more discrete components, and one or more integrated circuits, such as amplifiers, digital logic chips, microprocessors, and the like. The processor or control electronics may be implemented as a single integrated circuit, such as an application specific integrated circuit, or implemented using programmable components, such as field programmable gate arrays, microcontrollers, and the like.

The deformable surface 102 and controller 104 may be separate sections of the electronic device or may be combined and fabricated as a single component of the electronic device. Each of the deformable surface 102 and controller 104 may be contained within a housing of the electronic device.

Advantages to enabling a user input to be provided by a squeeze of the deformable surface 102 include ergonomic ease for a user to find the deformable surface 102, rather than having to feel for a switch or provide a noisy or uncomfortable tap. A squeeze input need not require a user's fingers to have a specific location on or around the deformable surface 102. A squeeze can provide differing levels of force to select between operations to be affected. A user may also be able to easily provide a sequence of squeezes or a length of time of a squeeze to indicate an operation to be affected.

Figure 1B:
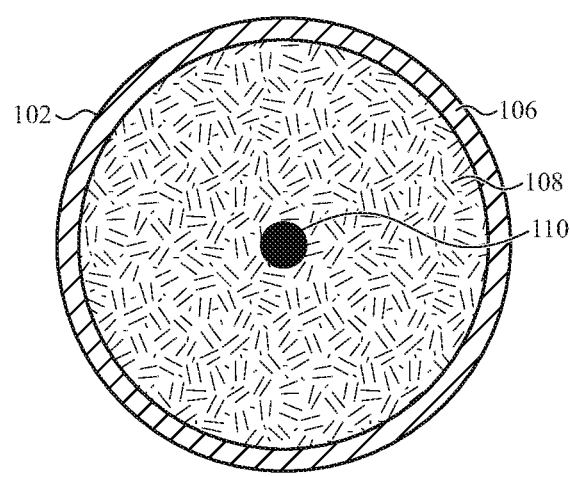
FIG. 1B illustrates a cross-section of the user input component of FIG. 1A, according to an embodiment.

FIG. 1B is a cross-section of the user input component 100 along the cut line A-A of FIG. 1A. The particular features and structures of the embodiment of FIG. 1B are shown to explain general features of the embodiments disclosed herein, and are not to be construed as limiting or required.

In the embodiment of FIG. 1B, the deformable surface 102 can be configured as a thin shell. The deformable surface 102 may be made of a non-stretching but flexible material 106, such as a plastic. The flexible material 106 of the deformable surface 102 can be such that its resting shape distorts under imposition of an outside force, such as a squeeze, but returns to its resting shape upon release of the imposed force.

The embodiment of FIG. 1B includes a pressure sensor 110. The pressure sensor 110 may be positioned completely interior to the deformable surface 102, or may be attached to the deformable surface 102. Further details and embodiments of the pressure sensor 110 will be described in more detail below in relation to FIGS. 4A-C and 5A-B.

The embodiment of FIG. 1B includes a material 108 that may fill the region or volume interior to the deformable surface 102. The material 108 may have a high value of incompressibility, i.e., there is a very small change in volume of the material under an impressed force.

The material 108 may also be elastomeric, i.e., a given volume thereof can be distorted from an unloaded shape by an imposed load force, but will return to its unloaded shape upon release of the load force. Such materials typically have a low Young's modulus. Examples of the material 108 with the properties just described include various types of silicone or an elastomer. The material 108 may also have a Poisson's ratio near 0.5, which is related to the incompressibility and elasticity of the material. Such an elastomeric material with high incompressibility will herein be termed an incompressible hyperelastic material (IHM). The material 108 can be such an IHM.

The IHM 108 may be selected so that, when a force is applied to it, the hydrostatic force internal to the IHM 108 rises. Shear forces through the IHM 108 are minimized due to the low Young's modulus. The IHM 108 may be chosen to exhibit minimal hysteresis, i.e., the time needed for the IHM 108 to return to a resting shape after distortion due to an applied force is less than an expected time between applications of the force.

The IHM 108 may be contained in a sealed region or volume; the surrounding surface of the sealed region may be formed by the deformable surface 102 and end sections (not shown in the cross-section). While the IHM 108 may fill the cavity or region within the deformable surface 102, this is not required. In some embodiments, a void or empty space remains within the deformable surface 102. The void can be formed by removing a section from the IHM 108, or by molding the IHM 108 during fabrication to have such a void. As explained further below, the void can contain a compressible gas or material.

The IHM 108 may be confined, such as within a container, to a region or volume. To allow for changes in operating conditions, such as temperature of the IHM 108 itself or of the electronic device as a whole, the container may contain a gas that can be vented to allow for corresponding changes in the volume of the IHM 108. Such changes may occur on a time scale long enough that the detection or measurement of a force applied to the user input component 100, as described subsequently, is not affected. Alternatively, the container may have a surface section that adjusts, such as by expanding with temperature, to accommodate changes in the IHM 108 induced by changes in the operating conditions. In still another alternative, the controller 104 may monitor the operating conditions, and modify accordingly how it operates in response to the signal or signals received from the one or more sensors on the deformable surface 102.

Figure 1C:
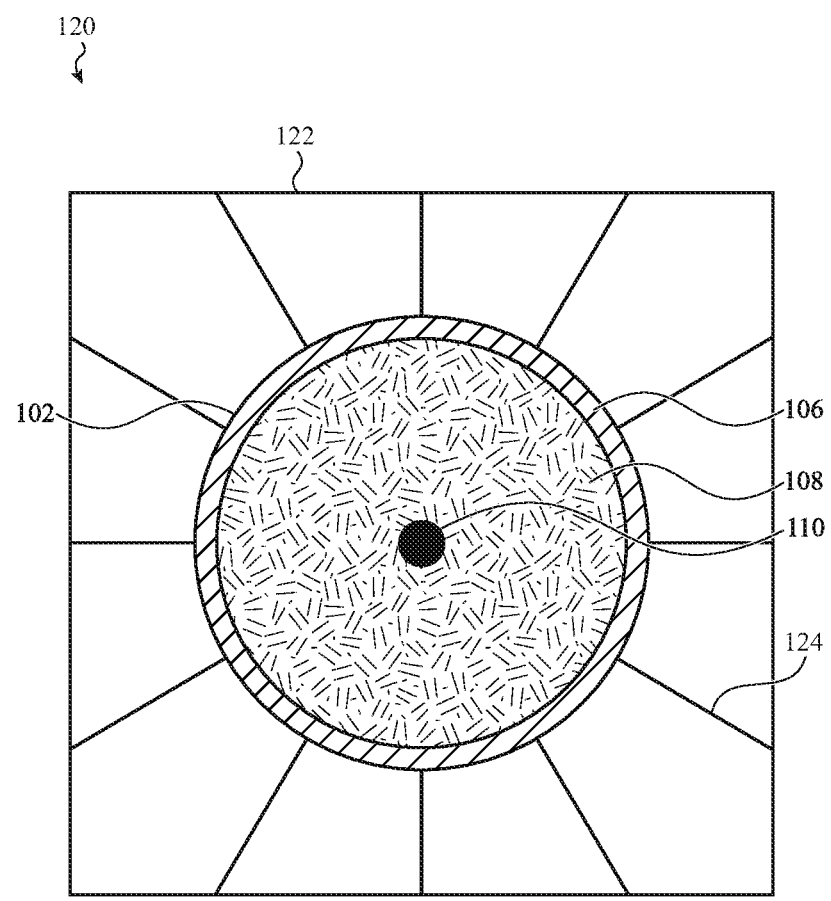
FIG. 1C illustrates a cross-section of the user input component of FIG. 1A, contained within a housing of a device, according to an embodiment.

FIG. 1C shows in cross-section a configuration in which the user input component 100 of FIG. 1A, is contained within a deformable section of a housing 122 forming an exterior of a device 120. In this embodiment the deformable surface 102 of the user input component 100 is not itself part of the exterior of the housing 122 of the device 120, as it may be in the configuration of FIG. 1B. The deformable section of the housing 122 shown in FIG. 1C may be configured as a square having sides that indent to allow a user's squeeze to be applied from opposite sides. However, in some embodiments, the deformable section of the housing 122 may have a circular cross-section or another shape for ergonomic, manufacturing, or aesthetic reasons. Within the deformable section of the housing 122 is a material 124 that may have a limited compressibility so that a force applied to the deformable section of the housing 122 causes the deformable surface 102 to distort or compress, as discussed above in regard to FIG. 1B.

The embodiments shown in FIGS. 1A-B have a cylindrical shape and a circular cross-section, but this is not required. The deformable surface 102 may have another cross-section that can be chosen for ergonomic comfort or other reasons.

Figure 2A:
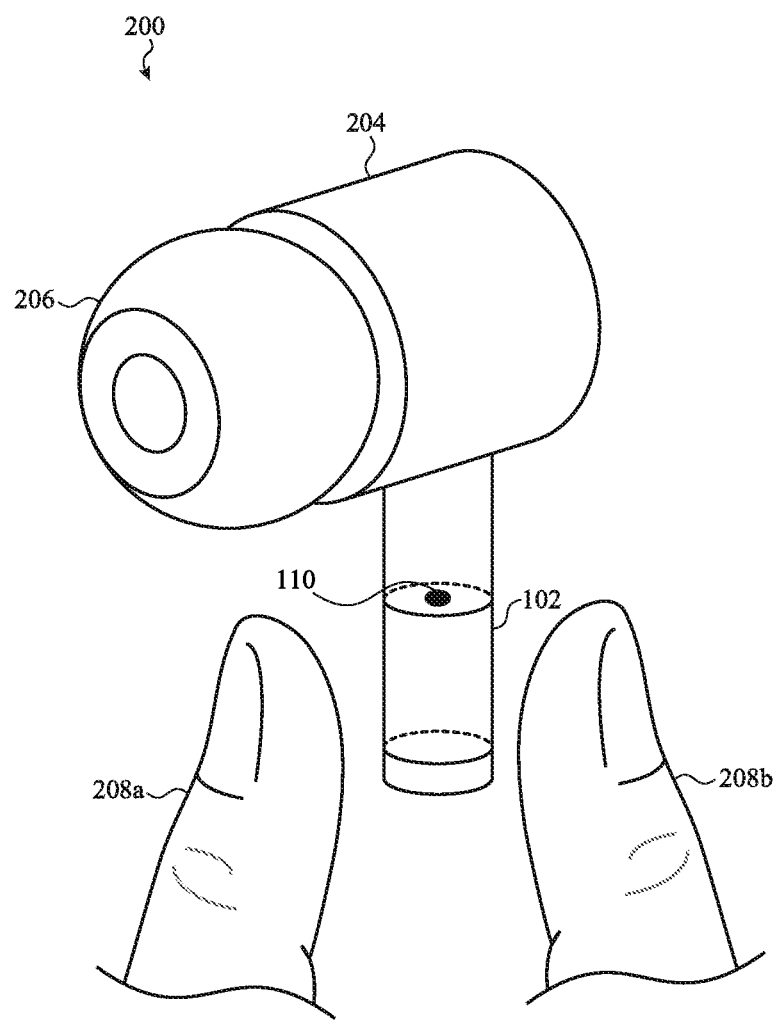
FIG. 2A illustrates an earpiece having a deformable surface as part of a user input component, according to an embodiment.
Figure 2B:
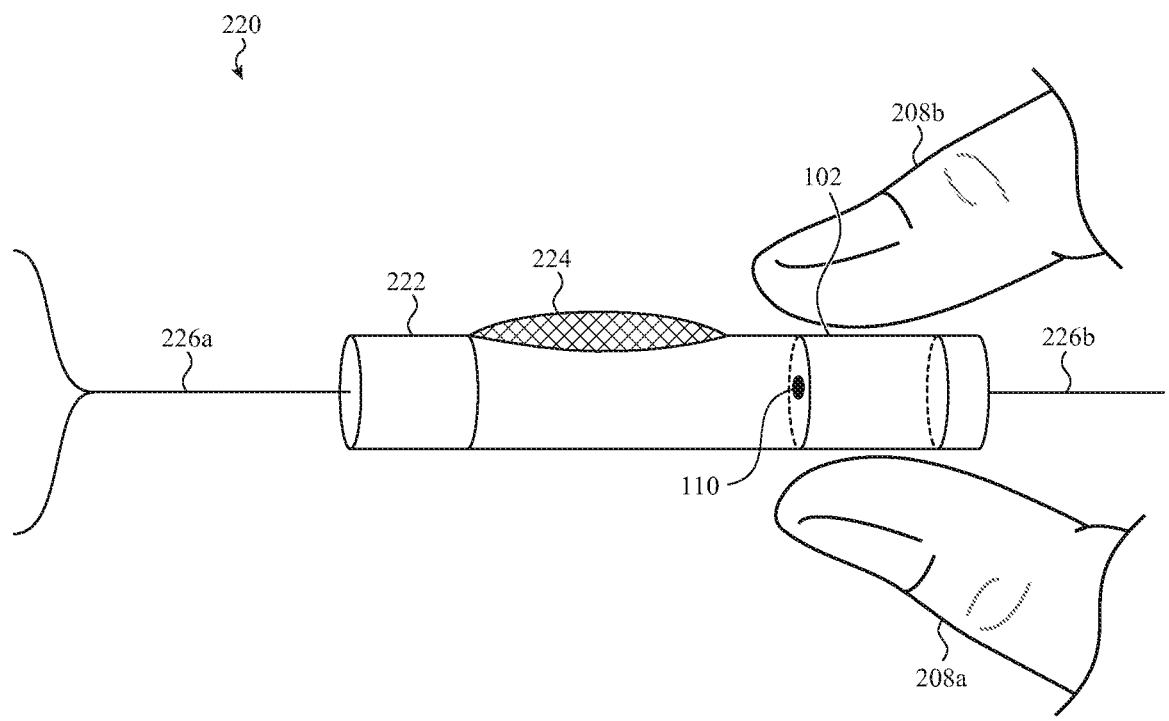
FIG. 2B illustrates an electronic device having a deformable surface as part of a user input component, according to an embodiment.
Figure 2C:
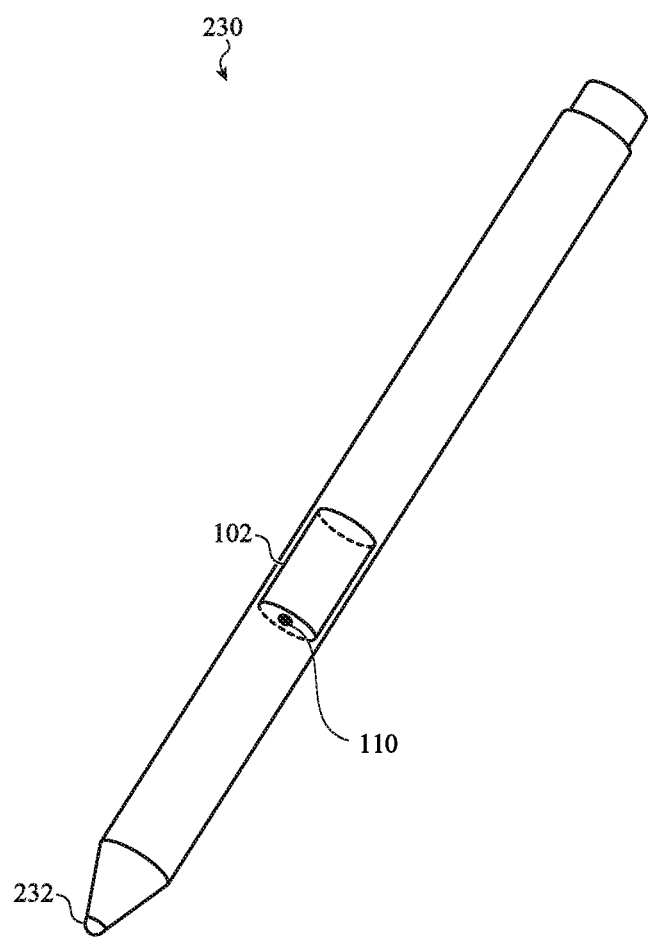
FIG. 2C illustrates a stylus having a deformable surface as part of a user input component, according to an embodiment.

The general configuration of the user input component 100 shown in FIGS. 1A-C can be used in multiple types of electronic devices, as shown in relation to FIGS. 2A-C.

FIG. 2A shows an earpiece 200, such as may be used in a set of earpieces, a wireless Bluetooth mobile phone headset, a wired headset, a portable music player, or other device. The earpiece 200 may incorporate a wireless transceiver operable to establish a radio link with an electronic device, or it may have a wired link (not shown) to an electronic device.

The earpiece 200 may have an earbud 206 that fits in a user's ear, and a controller 204 that provides support to the earbud 206. The controller 204 may serve some or all of the functions of the controller 104 discussed previously, and may also contain various electrical components, such as a wireless transceiver, a processor or other control electronics.

In the embodiment shown in FIG. 2A, a deformable surface 102 is located in, or as part of, a tubular extension from the controller 204. The deformable surface 102 allows a user to give inputs to affect one or more operations of the earpiece 200. The inputs can be given by squeezing or pinching the deformable surface 102 by fingers 208a, 208b of the user. As a result of such an input, a pressure sensor 110 attached to the deformable surface 102 may transmit a signal to a processor or control electronics within the controller 204, which can affect one or more operations of the earpiece 200 or a host device based on the signal received.

Examples of operations of the earpiece 200 that can be affected include, but are not limited to, volume control of a speaker within the earbud 206, on/off control of the speaker or of the earpiece 200 as a whole, on/off control of a microphone component (not shown) that is also attached to the earpiece 200, and other operations.

The signal provided by the pressure sensor 110 attached to the deformable surface 102 can be an analog signal, i.e., one having a continuous range of values. Such a signal may be useful, e.g., for providing variable control of volume of a speaker. Alternatively, the signal may contain one or more values from a discrete set of values.

In additional and/or alternative embodiments, the signal sent from the pressure sensor 110 to the controller 204 may consist of one or more values from a discrete set of values. In one example, an on/off toggle selection signal may be implemented as two discrete values, high and low, of a voltage. In another example, the signal may be selected from more than two voltage levels, corresponding to more than two levels of applied force, to select between multiple operations, such as skipping the current track of a music collection or skipping to the end of the collection. The signal may be formed as a time sequence of values from the discrete set of values; e.g., the single signal may be a time sequence of binary numbers selected to form an octal number.

In additional and/or alternative embodiments, the signal may combine both analog values and a discrete set of values. For example, if an applied force lies within a small to moderate range, an analog signal will be produced to indicate a volume change, whereas a strong applied force beyond a threshold will cause a binary on/off toggle operation.

In some embodiments, the applied force inputs that can be recognized by the pressure sensor 110 may be a sequence of squeeze inputs separated in time. For example, two successive squeeze inputs within a given time interval may cause the pressure sensor 110 to produce a signal that causes the controller 204 to affect operation of the electronic device, such as to change radio channels being received.

FIG. 2B shows another electronic device that can use the embodiments disclosed herein. FIG. 2B shows a wired headphone controller mechanism 220, such as may connect, via wires 226a and 226b, headphones worn by a user and a portable music player, such as a smartphone.

The headphone controller mechanism 220 comprises a deformable surface 102, such as described above, within an elongate tubular housing. The deformable surface 102 may form the elongate tubular housing itself, or may be contained within such an elongate tubular housing. The headphone controller mechanism 220 may be positioned during use at roughly chest height for easy access by a user to the deformable surface 102. The user may provide inputs to the headphone controller mechanism 220 by applying forces with fingers 208a and 208b to the deformable surface 102, as described previously. In response, the pressure sensor 110 may send corresponding signals to the controller 222. In additional and/or other embodiments, a single finger may press the deformable surface 102 against a rigid surface, such as the user's chest, to apply a detectable force. The deformable surface 102 may itself have a rigid section or side, as described below in regard to FIG. 3B, so that a user need only apply a force from one side.

As described previously, the controller 222 may contain a processor or control electronics to receive the signal sent from the pressure sensor 110 and produce a respective change in operation of the headphones. Such changes can include any of the changes discussed above (volume control, on/off switching) or other operations. The headphone controller mechanism 220 may also include other components, such as a microphone 224.

FIG. 2C shows another electronic device that can use the embodiments disclosed herein. FIG. 2C shows an electronic pointer or stylus 230 that can be used to provide user input to a display screen or user input surface on a laptop computer, smart phone, personal digital assistant, or another electronic device.

In the stylus 230 depicted in FIG. 2C, the deformable surface 102 may be a single unit that includes the electronics described in relation to the controller 104 of FIG. 1A. In the embodiment shown, a pressure sensor 110 is positioned on or operably near the deformable surface 102. The stylus 230 may include a contact point 232 to provide a touch input to a display screen of an electronic device.

The deformable surface 102 of the stylus 230 can receive squeeze inputs from a user to alter operation of the stylus 230 or provide input to the electronic device. For example, a squeeze input can be given to implement an on/off operation. In another example, a squeeze input can cause a change of a color of light emitted through the contact point 232.

Other electronic devices can also include various embodiments of the user input component 100 discussed above to allow squeeze inputs from users. Further details of the embodiments of user input component 100 will now be discussed. In what follows, the term "deformable input section" will refer to a user interface part or section of an electronic device to which a user can apply squeeze, pinch or other forces to distort or deform it and effect an input operation to the electronic device.

Figure 3A:
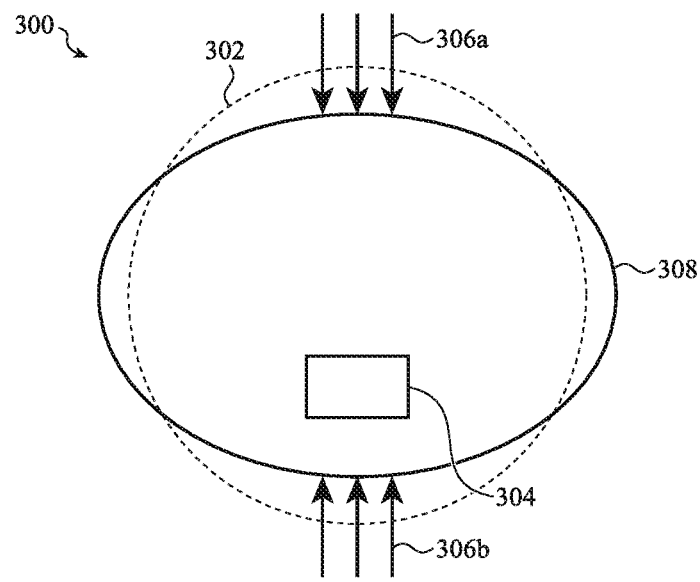
FIG. 3A illustrates a cross-section of a deformable input section of a user interface undergoing compression from an applied force or squeeze, according to an embodiment.

FIG. 3A shows a cross-section 300 of a deformable input section 302, such as an input section including the user input component 100 described above in relation to FIGS. 1A-C, being subjected to squeeze or pinch forces. In the embodiment shown in FIG. 3A, the deformable input section 302 surrounds an interior volume or region that contains an incompressible hyperelastic material (IHM) as described previously. For simplicity of discussion, the IHM is not indicated in FIG. 3A.

When not subjected to a force, the deformable input section 302 shown in cross-section 300 in FIG. 3A may be formed as a cylindrical region with a circular cross-section shape. However, that is not required: in other embodiments a deformable input section may have other cross-sectional shapes, such as oval, square, hexagonal, or another shape, such as may be useful for ergonomic comfort of the user or other functionality. In some that embodiments, the deformable input section need not have a uniform cross-section; e.g., some deformable input sections may be shaped as a tapered elongate section.

When forces 306*a* and 306*b* are applied to the deformable input section 302 of FIG. 3A, its unloaded circular shape is compressed. When the deformable input section 302 is made from a material that may flex but not stretch significantly (e.g., a plastic), the forces 306*a* and 306*b* compress the deformable input section 302 so that its cross-section may become the approximately ellipsoidal shape 308. For the embodiment of an originally circular cross-section, the approximately ellipsoidal shape 308 will encompass a smaller area (using the fact that for a fixed perimeter length, a circle encompasses the greatest area). Consequently, the interior volume of the deformable input section 302 will also be reduced, provided its length is maintained. The length can be maintained by rigid end pieces, for example, as explained in more detail below.

As a result of the volume decrease of the deformable input section resulting from the forces 306*a* and 306*b*, the IHM can elastically deform into a void or available space within the deformable input section 302. The available space can contain a gas or other material. The deformation of the IHM into the void thereby reduces the volume of the void, and so may change a pressure within the void.

Because of the initial circular cross-section of the deformable input section 302 shown in FIG. 3A and the hyperelasticity of the incompressible hyperelastic material, the change in pressure within the void can be independent of the direction in which the opposing forces 306*a* and 306*b* are applied. That is, applying the opposing forces 306*a-b* with the same magnitude from other directions around the deformable input section 302 can still result in effectively the same reduction of volume of the void and corresponding change in pressure in the void. In some embodiments, the applied forces 306*a-b* do not need to be applied on opposite sides of the deformable input section 302; e.g., it is clear that if the forces 306*a-b* were applied with an angular separation of 120° then there would still be a reduction of volume of the void and corresponding change in pressure in the void. The reduction of volume of the void can be independent of the direction in which the forces 306*a-b*, for constant magnitude and angular separation, are applied. In general, a deformable input section with such independence of direction of application of force is termed "equideformable." As a result, it can be easier for a user to provide an input to the electronic device, as there is no need for the user to feel for a needed position to apply a pinch or squeeze.

The embodiment of FIG. 3A is depicted with a pressure sensor 304 that can be configured to detect the change in pressure in the void. Particular embodiments with such configurations are described below in relation to FIGS. 4A-C.

Deformable input sections with other cross-sections can also have the cross-sectional area decrease due to exterior compressions. For example, a square cross-section could be distorted by forces applied along a diagonal into a non-square parallelogram, which has a reduced cross-sectional area. Forces applied to a first pair of opposite sides of a square will cause bulges on the other pair of opposite sides and indentations on the first pair. The resulting shape has a perimeter that departs further from the circle than the square, and so has a reduced cross-sectional area. Reducing the cross-sectional area of a deformable input section by application of forces can cause an overall reduction in the volume of the deformable input section. An IHM included within the deformable input section can then elastically distort to reduce a volume of an adjacent void.

Figure 3B:
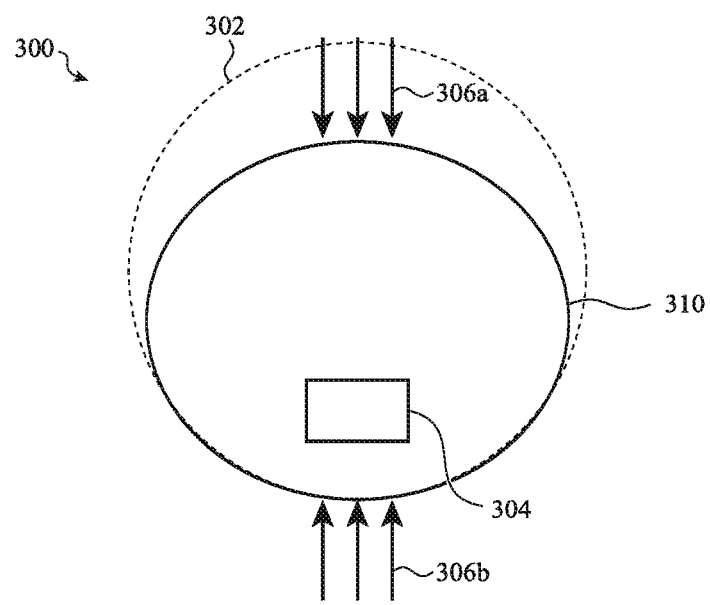
FIG. 3B illustrates a cross-section of another deformable input section of a user interface undergoing compression from an applied force or squeeze, according to an embodiment.

FIG. 3B shows a cross-section of a deformable input section 302, similar to the deformable input section 302 shown in FIG. 3A, being subjected to forces 306*a* and 306*b*. Unlike the situation depicted in FIG. 3A, the deformable input section 302 shown in FIG. 3B is such that its surface is rigid at the location at which force 306*b* is applied, and so its surface does not flex at that location, though the surface does flex at the application point of force 306*a*. This may happen, e.g., when the deformable input section 302 is mounted against a more rigid exterior of an electronic device. In this case, the applied forces 306*a-b* compress the deformable surface to have a distorted shape 310, reducing the cross-sectional area. As before, such a compression can cause an IHM to elastically distort to reduce a volume of an adjacent void. In the embodiment shown, since the cross-sectional area is reduced, the elastic distortion of the IHM may be along an axis perpendicular to the cross-section plane. The pressure sensor 304 may be mounted on an end of the deformable input section 302 along that axis to receive, detect, and measure the elastic distortion.

Figure 4A:
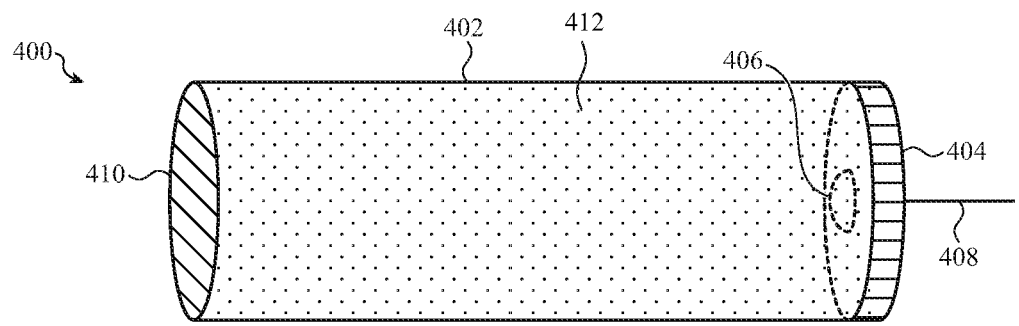
FIG. 4A illustrates a first embodiment of a deformable input section of a user interface.
Figure 4B:
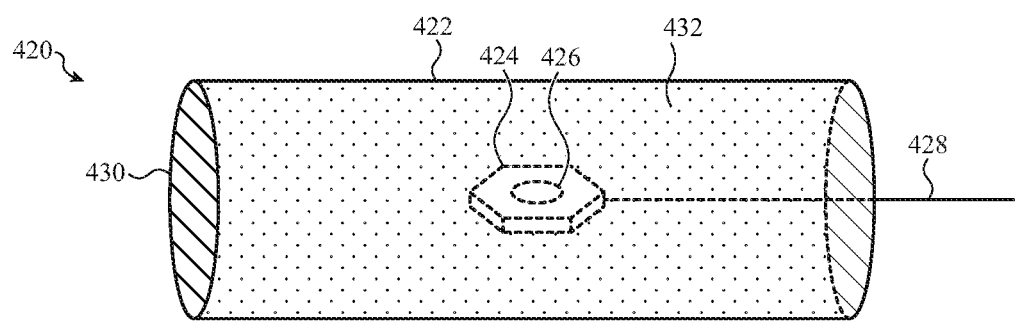
FIG. 4B illustrates a second embodiment of a deformable input section of a user interface.
Figure 4C:
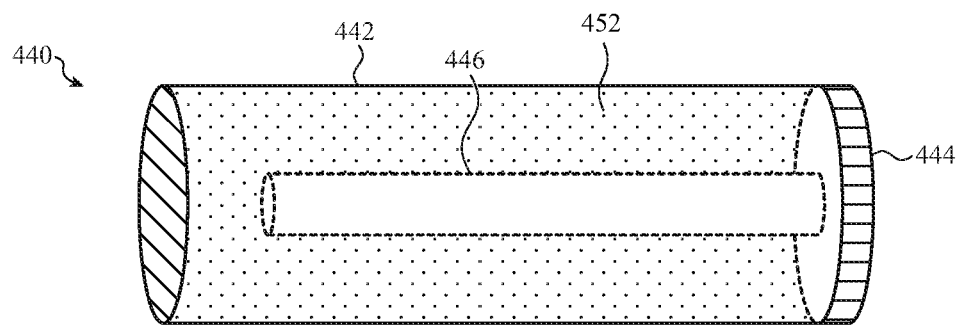
FIG. 4C illustrates a third embodiment of a deformable input section of a user interface.

Particular configurations of deformable input sections that can have such cross-sections and such elastic distortions of IHM are shown in FIGS. 4A-C.

FIGS. 4A-C show three particular configurations for deformable input sections, each having a pressure sensor, a body of IHM, and a position of a void in or adjacent to the IHM. These elements may completely fill a deformable surface, as shown and discussed in relation to FIG. 1B. Alternatively, the configurations shown in FIGS. 4A-C can be encapsulated within a surrounding material that forms a layer between the housing and the elements of the configurations, as shown and discussed in relation to FIG. 1C.

In the deformable input section 400 of FIG. 4A, the IHM 412 is configured within the interior volume defined by deformable surface 402 to have a circular cross-section, and so form a cylinder. In this embodiment, the end section 410 of the cylinder is an inflexible disk. At the other end of the cylinder a pressure sensor 404 is attached. The end section 410 and the pressure sensor 404 may be mounted with the deformable surface 402 so that the length of the cylinder cannot increase in response to a force applied to the cylinder.

The pressure sensor 404 contains a pressure sensing element that includes a void 406. Alternatively, the void 406 may be defined within the IHM 412; such a void 406 may be formed by machining or molding of the IHM 412, and the pressure sensing element is positioned to detect changes in pressure in the void 406. The void 406 may contain a material that can transfer pressure hydrostatically to surrounding surfaces or objects. Examples of such materials include a gas that does not react with the IHM 412, a fluid, a jell, a solid having a low shear modulus, or other material. Forces applied to the deformable surface 402 can cause the IHM 412 to elastically distort to reduce some of the volume of the void 406, or to transfer the forces hydrostatically. The reduced volume and/or transferred force can increase the pressure within the void 406, which can be detected by the pressure sensing element of the pressure sensor 404. Details of the pressure sensing element will be given below in relation to FIGS. 5A-B.

Linked with the pressure sensor 404 is a lead or connection 408, such as may contain one or more wires or fiber optic cables. The pressure sensor 404 may transmit signals on the connection 408 to a controller, such as controller 104 of FIG. 1A. The signals may provide data related to the pressure in the void 406. The controller may contain a processor to alter operation of the device based on the signals, or it can apply signal processing operations to the signals, such as filtering AD conversion, amplification and the like, and transmit the resulting modified signals to a further controller. Also, the connection 408 can be used to supply the pressure sensor 404 with power, voltage, or current, or to receive from the controller signals to electronic components within the pressure sensor 404.

FIG. 4B shows an alternate configuration of deformable input section 420, having a deformable surface 422 and shaped as a cylinder. The IHM 432 is contained within the interior volume defined by the deformable surface 422. The deformable input section 420 has two rigid end sections, such as end section 430, which can be as described for the end section 410 of FIG. 4A. In this embodiment the pressure sensor 424 is encased within the IHM 432 and has only the connection 428 extending through the right end section of deformable surface 422. Though depicted as extending through an end section, in some embodiments the connection 428 may extend through the cylindrical sides of the deformable surface 422. The connection 428 may be as described in relation to connection 408 of the embodiment in FIG. 4A.

The pressure sensor 424 includes a pressure sensing element that includes sensing electronics and a void 426. Alternatively, the void 426 may be defined in the IHM 432. The void 426 may be similar to the void 406 described in relation FIG. 4A.

FIG. 4C shows a third configuration of a deformable input section 440, having deformable surface 442 and shaped as a cylinder. The IHM 452 is contained within the interior volume defined by the deformable surface 442. The deformable input section 440 has a rigid end section on the left end and a pressure sensor 444 on the right end.

Within the IHM 452 is a void 446, shaped as a long tube. The void 446 can be formed in the IHM 452 by machining or during the molding of the IHM 452. The void 446 may be as described above in relation to the void 406. The pressure sensor 444 includes a pressure sensing element positioned to detect the pressure in the void 446.

The configurations shown in FIGS. 4A-C, and other embodiments as disclosed herein, include at least one pressure sensor by which to detect or measure a user applied force to a device. While only one pressure sensor is discussed in the configurations shown in FIGS. 4A-C, other embodiments may use more than one pressure sensor, such as for redundancy or for signal averaging. Details for one family of pressure sensors will now be presented.

Figure 5A:
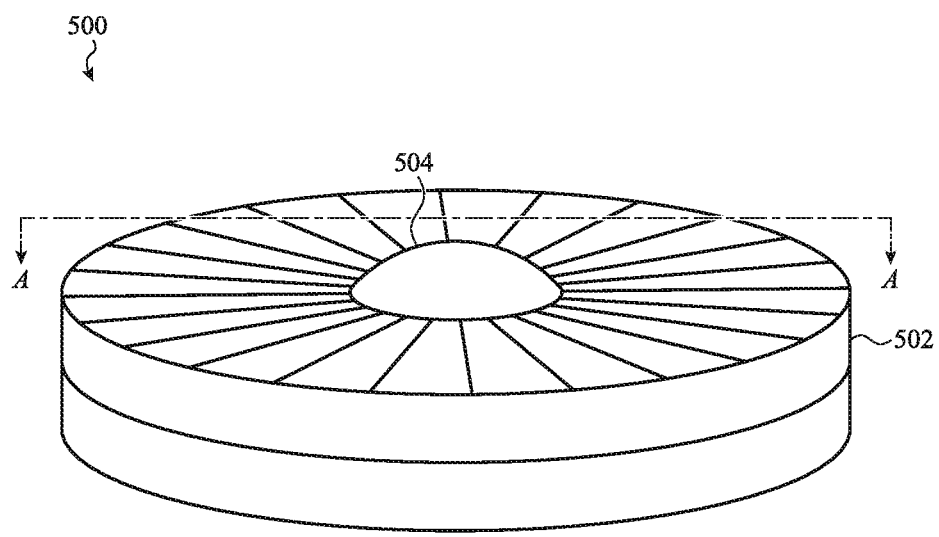
FIG. 5A illustrates a configuration of a pressure sensor that can be used with a deformable input section, according to an embodiment.

FIG. 5A shows an example of a pressure sensor 500 that can be used in the embodiments disclosed. The pressure sensor 500 has a supporting structure 502 that can also contain one or more electronic components. The supporting structure 502 may be either rigid or flexible. While the pressure sensor 500 is shown as disk shaped, the pressure sensor 500 could have other shapes or configurations.

The pressure sensor 500 also includes or is adjacent to a void 504. The void 504 may be part of a pressure sensing element of the pressure sensor 500. In the particular example shown in FIG. 5A, the void 504 is located in the center of a disk shaped face of the pressure sensor 500, and has a curved section extending above the disk. The curved section can be a surface defining the void 504, as discussed previously, and explained further in regard to FIG. 5B below. In some embodiments, the void 504 may not be located in the center of a face of the pressure sensor 500 (as shown), but may be located elsewhere on the face, or may be located off of the face altogether.

The particular pressure sensor 500 shown in FIG. 5A is configured to form an end face of a cylindrically shaped deformable input section, such as the examples shown in FIG. 4A and FIG. 4C, but could also be included entirely within the IHM, as in FIG. 4B.

Figure 5B:
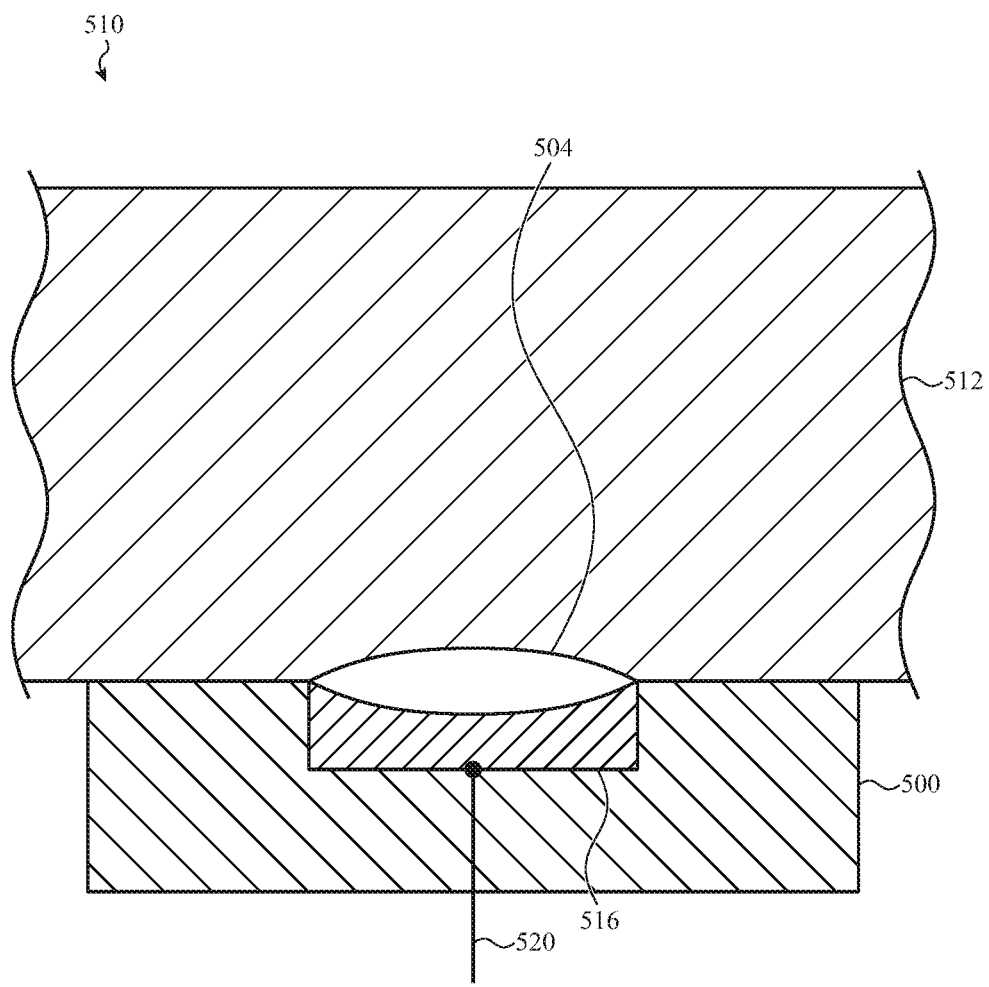
FIG. 5B illustrates a cross-section of the pressure sensor of FIG. 5A, according to an embodiment.

FIG. 5B provides a cross-sectional view 510 of the pressure sensor 500 shown in FIG. 5A, cut along the line A-A, and positioned so that the void 504 is in contact with the IHM 512, such as in the configurations shown in FIG. 4A and FIG. 4C. The pressure sensor 500 may include other elements than those shown in FIG. 5B.

The pressure sensor 500 includes a pressure sensing element having a void 504 and sensing electronics section 516. The void 504 may contain a compressible gas or may contain a material that is not compressible, such as a fluid, a jell, or a solid with a low shear modulus, or other material that can hydrostatically transfer pressure hydrostatically. The compressible gas may be inert, or may be such that it does not interact with the surrounding material. The void 504 may be contained within a shell and be configured as a bubble section affixed to a face of the pressure sensor 500.

When a squeeze or pinch force is applied to a deformable input section that includes the pressure sensor 500, either directly as in FIG. 1B or through an intermediate material as in FIG. 1C, the applied squeeze or pinch force may cause the volume within the deformable surface to be reduced. As the IHM 512 is incompressible, the volume of the void 504 may be correspondingly reduced as the IHM 512 elastically distorts while maintaining its original volume. The reduction in volume of the void 504 can lead to a change or increase in pressure within the void 504 that may be detected.

In various embodiments the pressure sensor may be configured so that the reduction in volume of the void 504 amplifies the volume reduction of the volume within the deformable surface of the deformable input section. For example, if the unsqueezed total volume within the deformable surface is 1 mm$^3$, with 0.9 mm$^3$ occupied by IHM 512 and 0.1 mm$^3$ occupied by void 504, and the force reduces the volume within the deformable surface by 1% to 0.99 mm$^3$, since the IHM 512 will not measurably compress in volume, therefore the volume of the void 504 is reduced to 0.09 mm³, i.e., a reduction of its volume by 10%. This can make for improved force detectability and/or measurability.

The sensing electronics section 516 may contain sensing elements configured to detect and/or measure either the pressure itself in the void 504 or a change in pressure induced by a user applied force. Various technologies may be used for detecting and/or measuring the pressure (or its change). In some embodiments, a piezoresistive element may be used. For example, a piezoresistive element may be affixed to or near a flexible shell of the void 504. A user applied squeeze may cause an elastic distortion of the IHM 512 to compress the flexible shell and cause the flexible shell to contract (or in some cases expand), and so detectably change the resistance of the piezoresistive element. In another example, a piezoelectric material may form part of a surface of the void 504. An increase in pressure in the void 504 due to a reduced volume may then be measurable by a voltage, or change in voltage, across the piezoelectric material. In a third example, two electrodes of a capacitive sensor may be affixed to or near the void 504. A change in volume of the void 504 may measurably change a capacitance between the electrodes.

The sensing electronics section 516 can include components such as a Wheatstone bridge and an integrated voltage source for measurement of resistances or other parameters. The sensing electronics section 516 may also contain amplifying elements. The sensing electronics section 516 may also include temperature measuring or compensating components. Other types of components may also be included in the sensing electronics section 516.

The pressure sensor 500 may have a wired connection 520 to connect to electronics of a device outside of the deformable input section. The wired connection 520 may include a connection from a voltage or current supply outside the deformable input section to provide power to the components of the sensing electronics section 516.

The pressure sensor may use the wired connection 520 to provide a signal that is correlated with the measured pressure (or change therein) in the void 504. The signal may be an analog signal (i.e., with a continuous range of values) such as an analog voltage across a Wheatstone bridge. Additionally and/or alternatively, the signal may be from a discrete set of values, such as outputs from an analog-to-digital converter within the sensing electronics section 516.

Though the term "void 504" was used to allow for the case that it contained a gas, embodiments that use pressure sensors having a fluid, a jell, a solid having a low shear modulus, or other material instead as the material in that region are within the scope of this disclosure.

The signal may be received by a processor that can apply further processing to the signal, such as filtering, smoothing, amplifying, temperature correlation, and the like, to obtain a measurement or detection of a user applied force. The correlation between the signal or pressure value and the value of the user applied force need not necessarily be linear, and may be derived from experiment or calibration. The processor may also receive signals correlated to a temperature of the device as a whole, an exterior temperature of the device or of the deformable input section to provide corrections, if needed, to the correlation between the signal value from the pressure sensor and the user applied force.

The processor may apply thresholding to determine whether a pressure (or change therein) may be the result of a user input. For example, a measured force may need to exceed a first threshold value to be interpreted as being a user input.

Based on the detection or measurement of a user applied force, the processor or controller may affect an operation of a device using the embodiments of deformable input sections just disclosed. In one example, a determination that the force exceeds a first threshold can be used to switch the device on or off. In another example, for an analog signal, the magnitude of the user applied force can indicate an amount of volume reduction to apply to a speaker or microphone. In a third example, the signal produced by the pressure sensor may extend over an interval of time, indicating a continuing squeeze by the user. Such a continuing signal can be used for on/off decisions, with a certain length of time needed before an on/off decision is made. This can serve as a guard against an inadvertent or noise signal changing the device's operational state. In a fourth example, a signal may indicate a sequence of pressure changes, indicating a sequence of user applied squeezes. Such a sequence may indicate the user's intent for a channel to be changed when the device is a radio, portable TV, or other portable device receiving from multiple sources.

The deformable input sections just discussed may be part of electronic devices that allow for use of methods now to be discussed.

Figure 6:
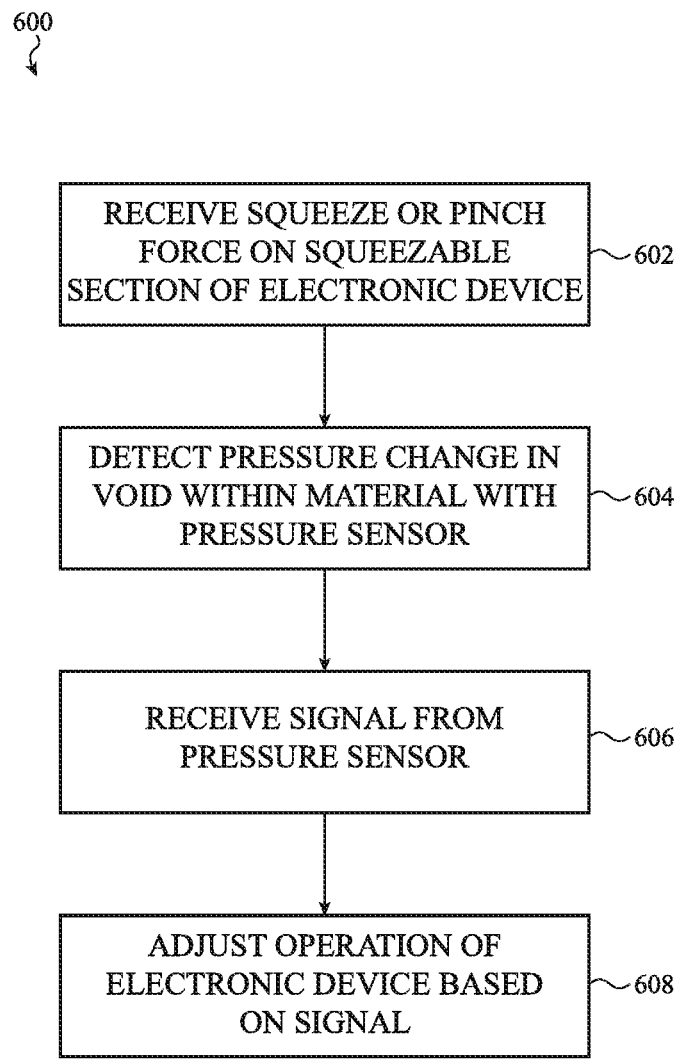
FIG. 6 is a flow chart of a method of using an electronic device.

FIG. 6. is a flow chart of a method 600 of operation of an electronic device having a deformable input section for user input. The electronic device may be any of the devices discussed in relation to FIGS. 2A-C, though the method 600 may be used with other electronic devices. The deformable input section may be as described in relation to FIGS. 1A-B, 3A-B, and 4A-C, or may have another configuration.

At stage 602 the deformable input section receives a squeeze, pinch, or press force applied by a user. The force may need to be greater than a threshold for the force to be detected or recognized as intentional at the deformable input section.

At stage 604, a pressure sensor detects the received force by detecting a pressure, or a change therein, within a void or compressible volume within a material within the deformable input section. To detect the pressure or its change, the pressure sensor may use a pressure sensing element abutting the void, such as a piezoelectric, piezoresistive, or capacitive sensor, though another sensing technology may be used. The material may be an incompressible hyperelastic material, such as silicone. The detected pressure, or pressure change, in the void may have a known correlation with the magnitude of the force.

At stage 606, the electronic device, or a processor or control electronics thereof, receives a signal from the pressure sensor related to the force applied to the deformable input section by the user. As described previously, the signal may be either analog or discrete. The signal may include multiple values over a time interval.

At stage 608, the processor or control electronics adjusts an operation of the electronic device based on the signal. Such adjustments may include muting or other volume control of a speaker, an on/off operation, a connection/disconnection from a wireless transmission source, or other operation. Alternatively, the processor or control electronics may modify and transmit the result to another device.

Figure 7:
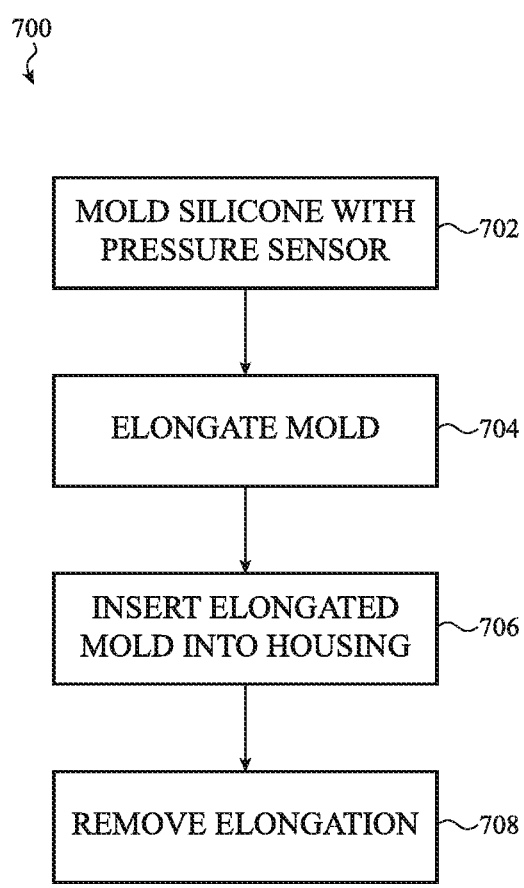
FIG. 7 is a flow chart of a method of fabricating a pressure sensor for a deformable input section of an electronic device.

FIG. 7 is a flow chart of a method 700 for fabricating a deformable input section of a device, such as in the embodiments described above. The deformable input section may be as in any of the embodiments described above, and as may be used in any of the devices described in relation to FIGS. 2A-C.

At stage 702, an incompressible hyperelastic material is molded with a pressure sensor. The incompressible hyperelastic material (IHM) may be silicone, and the pressure sensor may be as in the embodiments described in relation to FIGS. 5A-B. The molding process in stage 702 may join a pressure sensor that includes a pressure sensing element with a bubble or void, such as the pressure sensor 404 in FIG. 4A, with the IHM. The pressure sensor may be joined at an end of the IHM, or on a side thereof. In additional and/or alternative embodiments, the pressure sensor may be encapsulated within the IHM by having the IHM molded around it, as shown in FIG. 4B. In some embodiments, the IHM may have been cut from a long piece of the IHM extruded to the desired diameter. In additional and/or alternative embodiments, the IHM may have been molded separately to have a void, such as in the embodiments described in relation to FIG. 4C.

At stage 704 the molded combination of the pressure sensor and the IHM is stretched or elongated. This may be done mechanically, and/or may be done with heating applied to the IHM.

At stage 706, the elongated combination of the pressure sensor and the IHM is inserted into a deformable surface of the deformable input section being fabricated. This may be done while a force causing the elongation is being applied to the combination.

At stage 708, the cause of the elongation is removed, and the combination of the IHM and the pressure sensor expands to fill the volume within the deformable surface of the deformable input section. In additional and/or alternative embodiments, the combination is actively expanded, such as by compression on the ends, to fill the volume within the deformable surface of the deformable input section.

In additional and/or alternative embodiments, other methods of fabrication may use more or fewer stages than described in the stage of FIG. 7. For example, some embodiments may not use elongation as in stage 704, and may directly insert the mold of the IHM and the pressure sensor into the deformable surface. Thereafter, any remaining empty space surrounding the inserted mold may be filled by further injecting the IHM or another material into those empty spaces. In additional and/or alternative embodiments, a molded assembly of the IHM and the pressure sensor may be pulled into the deformable surface, causing it to elongate and narrow as the pulling force is applied. Once the molded assembly is in place and the pulling force is removed, the molded assembly can shorten and expand in cross section to substantially contact the deformable surface.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An earpiece, comprising: a housing defining an earbud configured for placement in a user's ear; and an elongated section extending from the earbud and having a deformable surface and a non-deformable surface; a speaker disposed in the earbud; a deformable input section contained within the elongated section and disposed between the deformable surface and the non-deformable surface; a pressure sensor mechanism having a pressure sensing element; and an incompressible hyperelastic material contained within a sealed region within the deformable input section; wherein: a void between the incompressible hyperelastic material and the pressure sensing element is defined within the sealed region; a force applied by the user to the deformable surface is transferred by the incompressible hyperelastic material from the housing to the void to alter a pressure in the void; and the pressure sensing element is operable to detect the pressure in the void.

2. The device of claim 1, wherein the incompressible hyperelastic material comprises silicone.

3. The device of claim 1, wherein the void contains a compressible gas.

4. The device of claim 1, wherein: the applied force causes a reduction of a volume of the sealed region; and a volume of the void is reduced by an amount correlated with the reduction of the volume of the sealed region.

5. The device of claim 4, wherein the pressure sensor mechanism forms part of a surface of the sealed region.

6. The device of claim 1, wherein the pressure sensing element is encapsulated by the incompressible hyperelastic material.

7. The device of claim 1, further comprising a processor operably linked to the pressure sensing element, wherein: the processor is configured to receive a signal from the pressure sensing element; and the processor is operative to determine a magnitude of the applied force based on the signal.

8. The device of claim 7, wherein the signal comprises a value from a discrete set of values.

9. The device of claim 8, wherein the signal comprises a time sequence of values from the discrete set of values.

10. The device of claim 7, wherein the signal is an analog signal.

11. An earpiece, comprising: an earbud containing a speaker configured for placement in a user's ear; a deformable input section extending from the earbud and including a pressure sensor mechanism; and control electronics communicatively linking the pressure sensor mechanism and the earbud wherein: the pressure sensor mechanism comprises: an incompressible hyperelastic material contained within a sealed region within the deformable input section, the incompressible hyperelastic material defining a void; and a pressure sensing element positioned to detect a pressure in the void; the deformable input section is configured to receive at least a first force and a second force contemporaneously; the second force at least partially opposes the first force; and first force and the second force are transferred by the incompressible hyperelastic material to the void to cause an alteration in the pressure in the void.

12. The earpiece of claim 11, wherein: the first force and the second force cause a reduction of a volume of the deformable input section; and a volume of the void is reduced by an amount correlated with the reduction of the volume of the deformable input section.

13. The earpiece of claim 11, wherein: the control electronics are operative to receive a signal from the pressure sensor mechanism; and the control electronics are operative to determine a magnitude of at least one of the first force and the second force based on the signal.

14. The earpiece of claim 13, wherein the control electronics are operative to alter operation of the speaker responsive to the determined magnitude.

15. The earpiece of claim 14, wherein the control electronics are operative to alter an audio volume produced by the speaker in response to the determined magnitude.

16. An earpiece, comprising: an earbud housing; a speaker held by the earbud housing; an elongated section extending from the earbud housing and having, a deformable surface; a non-deformable surface; an incompressible hyperelastic material disposed between the deformable surface and the non-deformable surface; a pressure sensor comprising a pressure sensing element; and a sealed compressible region positioned between the pressure sensing element and the incompressible hyperelastic material; wherein: a force applied to the deformable surface causes a reduction in a volume of the sealed compressible region; the volume of the sealed compressible region is reduced by an amount correlated with the applied force; and the pressure sensing element is configured to detect a change in pressure in the sealed compressible region produced by the reduction in the volume of the sealed compressible region.

17. The earpiece of claim 16, wherein the incompressible hyperelastic material comprises silicone.

18. The earpiece of claim 16, wherein the sealed compressible region contains a compressible gas.

\* \* \* \* \*

UNITED STATES PATENT AND TRADEMARK OFFICE
CERTIFICATE OF CORRECTION

Page 1 of 1

PATENT NO. : 10,659,866 B2
APPLICATION NO. : 16/131996
DATED : May 19, 2020
INVENTOR(S) : John Stephen Smith et al.

It is certified that error appears in the above-identified patent and that said Letters Patent is hereby corrected as shown below:

In the Claims

Column 16, Line 41; Claim 11:
"earbud wherein: the pressure sensor mechanism comprises:"
Should read as:
--speaker wherein: the pressure sensor mechanism comprises:--

Column 16, Line 49; Claim 11:
"force; and first force and the second force are transferred by"
Should read as:
--force; and the first force and the second force are transferred by--

Signed and Sealed this
Twenty-ninth Day of September, 2020

Andrei Iancu
*Director of the United States Patent and Trademark Office*